Patented June 9, 1931

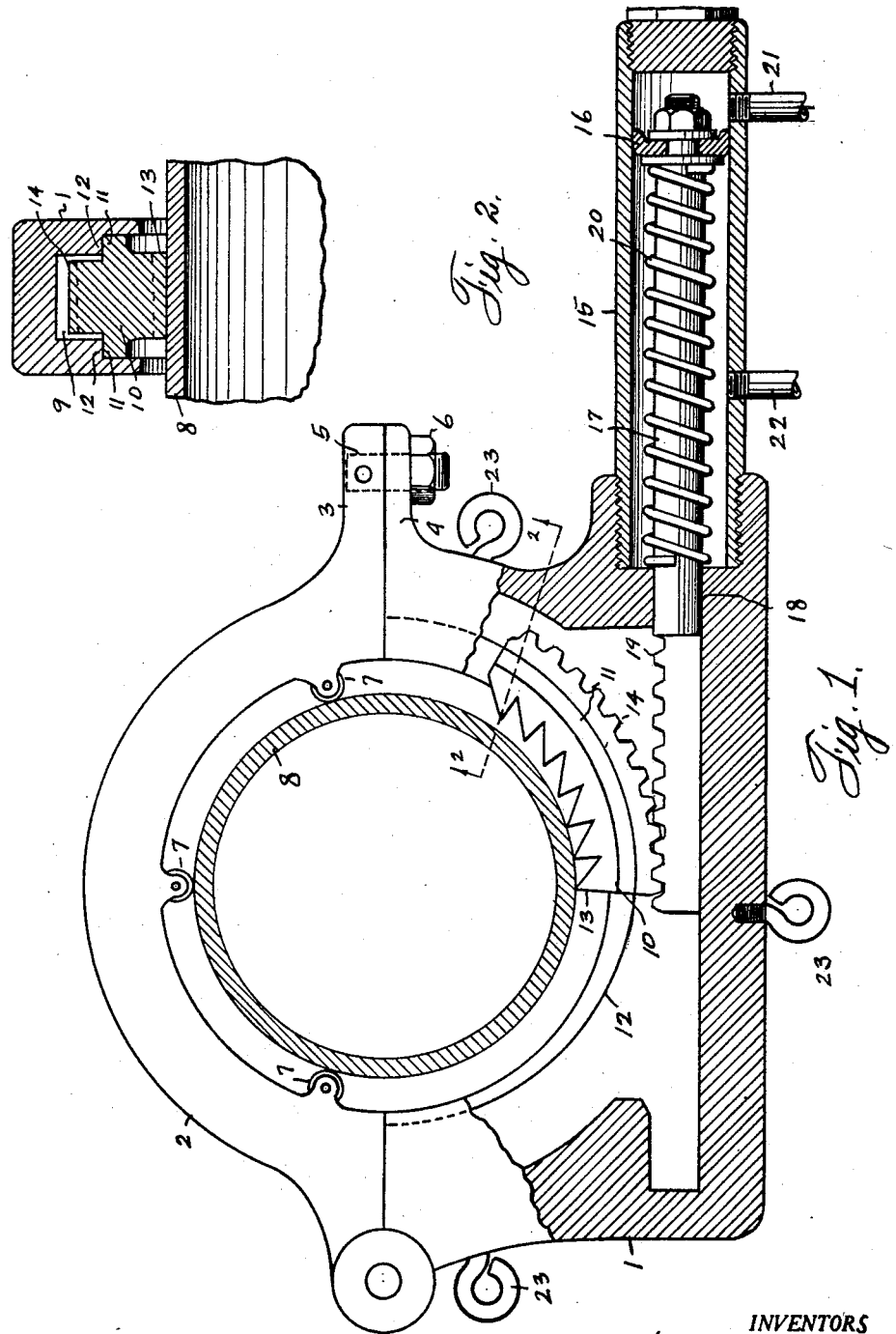

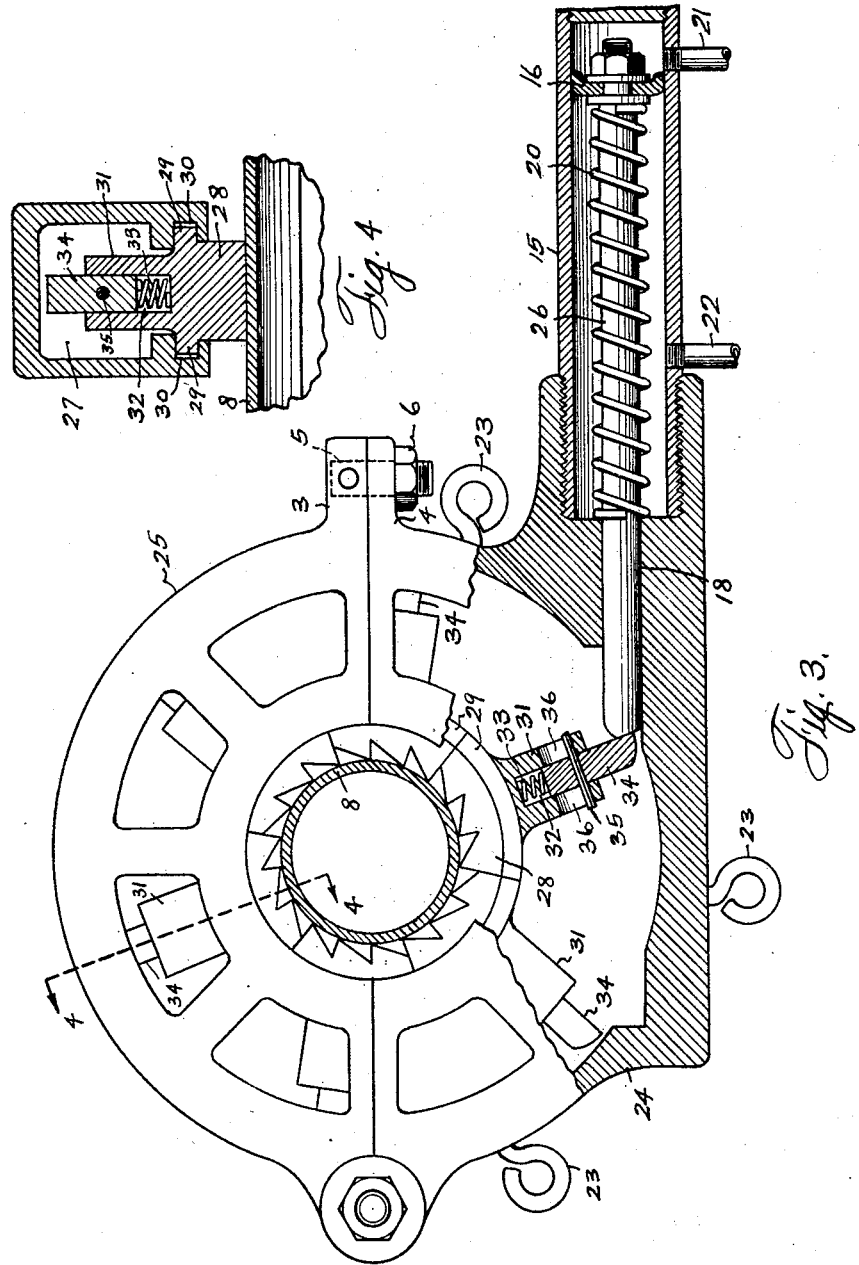

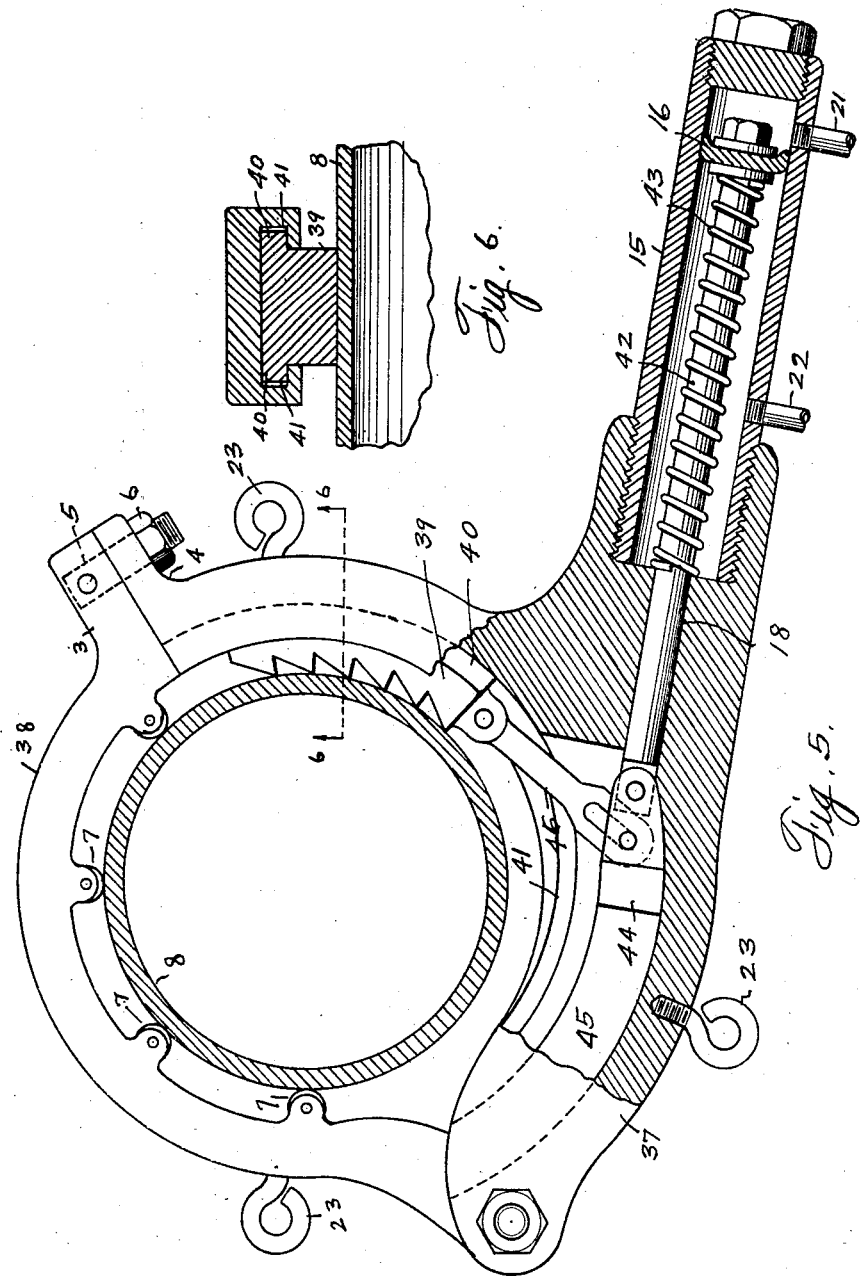

1,808,959

UNITED STATES PATENT OFFICE

CHARLES H. LANE AND CHARLES H. REYNOLDS, OF HOUSTON, TEXAS

TONG

Application filed September 7, 1929. Serial No. 391,094.

This invention relates to new and useful improvements in a tong.

One object of the invention is to provide an apparatus of the character described specially designed to be operated by hydraulic or fluid pressure and provided particularly for rotating pipe or other similar objects.

A particular object of the invention is to provide a tong of the character described, which is useful in rotating or turning pipe in screwing the sections thereof together or in unscrewing and disconnecting said sections.

While the tong is specially applicable for use in handling verticle pipe in a well bore, it is also capable of general application and use.

With the above and other objects in view, the invention has particular relation to certain novel features of construction, operation and arrangement of parts, an example of which is given in this specification and illustrated in the accompanying drawings, wherein:—

Figure 1 shows a plan view of one form of the tong, shown partly in section.

Figure 2 shows a sectional view taken on the line 2—2 of Figure 1.

Figure 3 shows a plan view of another form of the tong, partly in section.

Figure 4 shows a fragmentary sectional view, taken on the line 4—4 of Figure 3.

Figure 5 shows a plan view of still another form of the tong, partly in section.

Figure 6 shows a vertical sectional view taken on the line 6—6 of Figure 5.

Referring now more particularily to the drawings wherein like numerals of reference designate similar parts in each of the figures the numerals 1, 2 designate the sections of the tong casing which are hinged together at one end and whose other ends are formed with the coinciding flanges 3, 4 which fit together and one of which has a bolt 5 secured thereto which is fitted through a bearing in the other and is outwardly threaded to receive a securing nut 6. The hinge section 4 has inside bearings as 7 adapted to bear against the pipe 8 to be turned and the other section 1 has an inside arcuate groove 9 in which the jaw 10 is mounted. This jaw has the lateral arcuate ribs 11, 11 which ride against the arcuate cams 12, disposed on the opposite sides of the groove 9. The inner side of the jaw 10 has the ratchet teeth 13 and the outer side thereof is formed with rack teeth 14. Attached to the casing section 1 there is a cylinder 15 whose outer end is closed and within this cylinder there is a plunger 16 attached to the outer end of the plunger rod 17. This rod works through the bearing 18 and its inner end is formed with a rack member 19 in mesh with the teeth 14. Surrounding said rod 17 and interposed between the plunger 16 and the bearing member 18 there is a strong coil spring 20. A pressure line 21 enters the outer end of the cylinder 15 and there is a relief line 22 leading from the other end of said cylinder.

In use the tong is usually suspended in a horizontal plane so as to be readily secured about a vertical pipe, said tong being provided with suitable eyes 23 for the attachment of suspending cables or chains thereto. In operation, the tong is clamped about the pipe as shown and fluid under pressure is applied through the line 21 to force the plunger 16 inwardly in its cylinder. As the plunger so moves the jaw 10 will be moved along the cams 12 in to contact with the pipe 8 and will turn the same a partial rotation when the plunger 16 clears the relief line 22, the pressure will be suddenly relieved in the cylinder and the spring 20 will return the plunger 16 to its original position and will carry the jaw 10 back to its original position and in position to again engage with and turn the pipe. The pipe 8 is thus rotated by successive partial rotations until it is screwed up into the connecting collar or unscrewed.

In Figure 3 the casing sections 24, 25 are hinged together and may be secured around the pipe in a manner similar to that shown in Figures 1 and 2. The section 24 of the tong has the cylinder 15 connected thereto and located in this cylinder there is a plunger 16 attached to the plunger rod 26. This plunger rod works through the cylinder and around it there is a strong coil spring interposed between the plunger 16 and the bearing 18. In this form the tong casing has the internal annular channel 27 in which the arcuate jaws 28 are mounted to revolve. These jaws when assembled, form, in effect, a continuous sectional ring about the pipe 8 to be turned and each jaw has the lateral ribs 29, 29 which move around in the arcuate grooves or tracks 30, 30 in the adjacent sides of the casing. Each jaw has an outward radial bearing member 31, each member having a deep socket 32 in which is located the coil spring 33 and seated on said spring there is a dog 34 which has the cross pin 35 therethrough whose ends work in radial slots 36, 36 provided on opposite sides of the radial bearing member 31.

In operating this form of tong upon the introduction of fluid pressure through the line 21 the piston 16 and rod 26 will be driven inwardly and the inner end of the piston rod 26 will engage against the adjacent dog 34 and impart a partial rotation to the jaws, which being in engagement with the pipe 8, will cause said pipe to rotate correspondingly. During this partial rotation the next succeeding dog 34 will be carried around into position to be engaged by said piston rod 26 upon its next succeeding inward stroke. This next succeeding dog referred to will engage said piston rod and be depressed or forced inwardly thereby and when the piston clears the outlet line 22 the pressure in the cylinder being relieved the spring 20 will carry said piston rod outwardly into its original position and when its free end clears the said next succeeding dog 34, said dog will be suddenly forced outwardly by the spring 33 in front of the piston rod 26 so that when the piston 16 is again forced inwardly the jaws 28 will again be partially rotated as above explained. The operation is thus continued until the pipe is screwed into the adjacent coupling or unscrewed from it.

Referring to the form shown in Figures 5 and 6 the numerals 37, 38 designate the sections of the tong casing which are pivoted together at one end, and whose other ends are formed and secured together in a manner similar as shown in Figure 1. The section 38 has the inside bearings 7 which bear against the pipe 8 as in Figure 1. In this form there is an arcuate pipe engaging jaw 39 which has the lateral arcuate ribs 40, 40 which run in the cam shaped grooves or tracks 41, 41. In this form, the section 37 of the casing has the cylinder 15 attached thereto, in which is located the piston 16 which is attached to the piston rod 42 whose inner end works through the bearing 18 and surrounding this piston rod and interposed between the plunger 16 and the bearing 18 there is a strong coil spring 43. This cylinder has the inlet pressure line 21 and the release line 22 as in the other forms. Pivotally connected to the inner end of the rod 42 there is an anchor 44 which runs in an arcuate track 45 in the casing section 37. This anchor is connected to the jaw 39 through the instrumentality of a connecting link 46. When pressure fluid is applied through the inlet line 21 the plunger 16 will be driven inwardly and will operate through the anchor 44 and the link 46 to actuate the jaw 39 which in turn will impart a partial rotation to the pipe 8. When the plunger 16 clears the relief line 22 and pressure in the cylinder is relieved the spring 43 will return the plunger and the jaw 39 to their original positions and the operation may be repeated until the pipe 8 is screwed up or unscrewed.

The drawings and description disclose what we now consider to be preferred forms of the invention by way of illustration, but it is obvious that structural changes may be made without departing from the principle of the invention as defined by the appended claims.

What we claim is:

1. A tong including a casing formed of sections, means for securing the sections together about a pipe, gripping means in the casing engageable with the pipe therein and adapted to rotate the pipe, yieldably mounted dogs on said gripping means, means operable by fluid under pressure and operatively connected with and adapted to impart partial rotations to said gripping means, said fluid pressure operable means including a reciprocable rod engageable successively with said dogs.

2. A tong including a casing formed of sections, means for securing the sections together about an object to be rotated, a track in the casing, gripping means movable in said track, and adapted to engage and rotate said object yieldably mounted, radial, abutments carried by said gripping means, means operable by fluid, under pressure and engageable successively with said abutments and adapted to impart successive rotative movements to said gripping means.

3. A tong including a casing, gripping means therein having radial, yieldable dogs, a reciprocable member engageable successively with said dogs, to impart successive partial rotations to said gripping means, means for reciprocating said member, said reciprocating means including mechanical means for moving said member in one direction and fluid pressure operable means for moving said member in another direction.

4. A tong including a casing, pipe gripping means therein adapted to engage and rotate a pipe yieldable, radial dogs carried by said gripping means, a cylinder associated with the casing, reciprocable means in the cylinder effective to successively engage said dogs and to impart partial rotations successively to the gripping means, means for applying fluid under pressure to the reciprocable means to actuate the same.

5. A tong including a casing, pipe gripping means therein adapted to engage and rotate a pipe yieldable abutments on said gripping means, a cylinder associated with the casing, reciprocable means in the cylinder effective to successively engage said abutments and to impart partial rotations successively to the gripping means, means for applying fluid under pressure to the reciprocable means to actuate the same, in one direction, and other means for actuating said reciprocable means in another direction.

6. A tong including a casing, pipe gripping means therein, capable of successive partial rotation about the casing and engageable with a pipe in the casing and effective to rotate the pipe, yieldable abutments on said gripping means, actuating means effective to successively engage said abutments and to impart successive rotations to said gripping means and means for applying fluid under pressure to said actuating means to impart successive actuations thereto.

In testimony whereof we have signed our names to this specification.

CHARLES H. LANE.
CHARLES H. REYNOLDS.